Sept. 22, 1964   J. R. JANAC   3,149,434
FISHING LURE
Filed Sept. 25, 1961

INVENTOR.
John R. Janac.
BY
Silverman, Mullin & Cass
Attys

United States Patent Office 3,149,434
Patented Sept. 22, 1964

3,149,434
FISHING LURE
John R. Janac, 6718 N. Ionia, Chicago, Ill.
Filed Sept. 25, 1961, Ser. No. 140,368
2 Claims. (Cl. 43—42.24)

This invention relates generally to improvements in fishing lures and more particularly, relates to an improved artificial bait formed of a narrow, elongate strip of parchment skin characterized by a curling and twisting action when wetted which simulates natural worm bait.

A major object of the invention is to provide a fishing lure of the character described which comprises a narrow, elongate strip of a split parchment which curls and twists along the longitudinal axis thereof when wetted and especially when being moved through the water secured to a fish hook.

Another object of the invention is to provide a fishing lure of the character described which comprises a split parchment member characterized by having a lingering odor when wetted, which is very white in color by reason of the bleaching action to which same has been subjected during manufacture of the parchment skin and which is capable of being used repeatedly without loss of effectiveness.

Another important object of the invention is to provide a fishing lure of the character described which is highly economical to manufacture and package, which can be packaged compactly and inexpensively, which is simple to use both for a single casting thereof or repeatedly.

Another object of the invention is to provide a fishing lure of the character described which when wetted will absorb water in a manner which results in the lure having a natural, worm-like movement and configuration while in the water.

The foregoing and other objects of the invention will become apparent from the ensuing disclosure in which a preferred embodiment has been described in detail in the specification and illustrated in the accompanying drawing. Minor departures from the structural features thereof may occur to the skilled artisan without sacrificing any of the advantages thereof.

The great variety of fishing lures and baits heretofore available have included the use of animal skins which have been dressed and tanned and waterproofed or rendered water repellent by surface treatment. Such generally dressed animal skins or hides are known as leather and have been haphazardly formed into strips for attachment on fishing hooks as bait. I have determined that there are numerous properties inherent in the structure of leather which deter against use of leather as a fishing lure or bait.

When wetted, a flat leather sheet loses strength in the plane thereof so that when suspended from a fish hook, it assumes a limp hanging attitude of an inanimate object such as a weed, in water. It has no significant attribute of anything life-like which would serve to attract fish. A leather product has a pronounced color as compared to substantially pure white and thereby is not highly reflective in water and does not release any significant odor in water. Leather does not wet rapidly and many forms thereof do not absorb water entirely through the same. Also, a leather product requires a considerable length of time to dry so that repeated use thereof is considerably impaired.

The invention employs a narrow, elongate strip of parchment skin and preferably, split calf skin in the form of parchment. For purposes of understanding the invention, leather and parchment skin must be distinguished. Parchment is an animal skin which has been specially treated and bleached, and has not been subjected to the ordinary dressing, tanning and tawing procedures commonly used in making leather. Parchment is highly water absorbent and almost pure white in color and has a pronounced odor in water.

Figure 1:
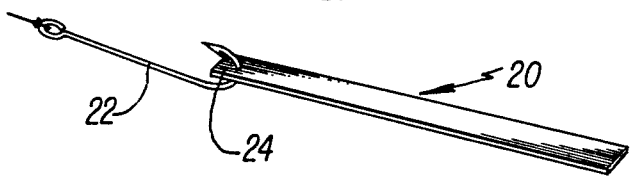
FIG. 1 is a perspective view of the fishing lure embodying the invention attached to a fish hook preparatory to being immersed in water.

Referring to the drawing, the reference character 20 designates generally the fishing lure or bait embodying the invention. The lure 20 is illustrated in FIG. 1 attached on a conventional fish hook 22, the barbed end of which has been pierced through one end 24 of the lure 20. As seen in FIG. 1, the lure 20 is illustrated in dry condition preparatory to being immersed in water for fishing purposes. The lure comprises a narrow, flat strip of a split parchment skin, said strip being substantially rectangular in plan view thereof. The strip is elongate and has a substantially greater length than width for the specific purpose of realizing certain distortions in the configuration of the lure 20 when wetted.

Figure 4:
FIG. 4 is a fragmentary transverse sectional view taken through said lure when dry and enlarged to illustrate the multiple-ply structure of said lure.

Referring to FIG. 4, which is a somewhat exaggerated view in order to bring out certain characteristics of the lure 20, said parchment strip has a very thin skin 26 overlying a layer 28 which forms the opposite surface of the strip. The skin 26 looks very much like the layer 28 from all outward appearances, but has less porosity and greater density than layer 28. The layers 26 and 28 are adhered to each other and will continue to so adhere even when immersed in water.

Figure 2:
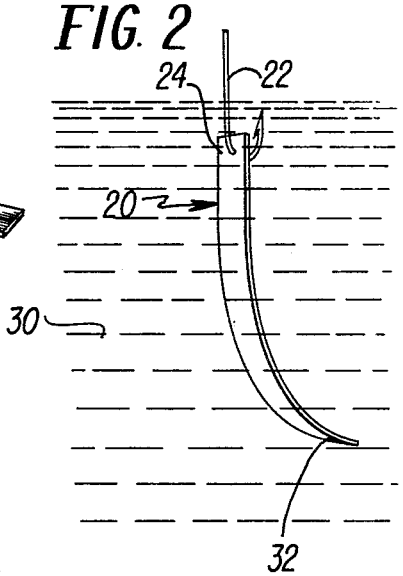
FIG. 2 is a perspective view of said lure suspended in water from a fish hook and in the process of being wetted to assume a natural worm-like attitude.
Figure 3:
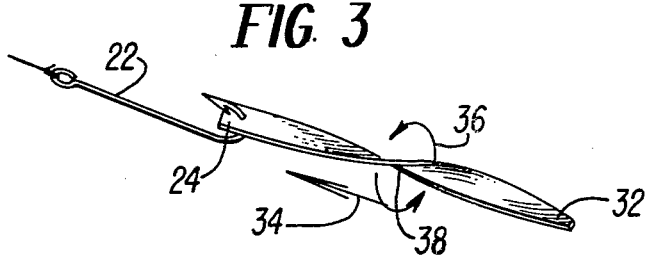
FIG. 3 is a perspective view of said lure per se, being moved in the water.

Referring to FIG. 2, when the strip 20 is immersed in water 30, the layers commence to wet or absorb water rapidly at unequal rates. The opposite free end 32 commences to curl upward toward end 24 and the strip commences to twist slightly along the longitudinal axis thereof. The curling and twisting becomes pronounced as wetting continues so that a life-like motion for the lure is noted. When the lure 20 is moved through the water as illustrated in FIG. 3 in the direction of arrow 34, the lure 20 twists medially as indicated by the arrows 36 in circular form. Although only one helix is illustrated at 38 intermediate the ends of the lure 20, I have discerned more than one helix in some instances during such movement of the lure 20 in the water. The lure 20 seems to be an animate object such as a worm and has a somewhat serpentine or undulating movement in the water, especially when the movement thereof along the direction of arrow 34 is curtailed temporarily during fishing.

The movement of the lure 20 when wetted is believed attributable to the unequal rate of water absorption by the skin 26 and layer 28 respectively. Such an unequal rate of water absorption may give rise to the twisting and curling movement of the lure 20 in the water.

Since the lure 20 is very white, it is attractive to fish. The movement of the lure 20 when wetted occurs very rapidly as distinguished from the substantially greater length of time required for leather to wet thoroughly. In addition, the parchment retains a definite odor when wetted due to its raw, differently dressed nature and the longer it remains in the water, the more pronounced the smell. Thus, the combination of undulating and curling movement of lure 20 so long as it remains in the water, the pure white color which is highly reflective and the raw smell thereof produces a very attractive and effective lure.

Figure 5:
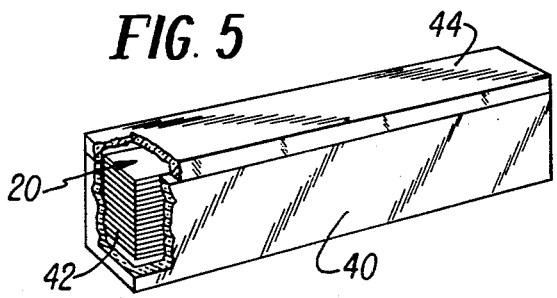
FIG. 5 is a perspective view of a package or container for a plurality of said lures and having a portion thereof removed to illustrate the compact manner in which said lures can be stored flat therein.

Referring to FIG. 5, the lure 20 can be packaged conveniently and compactly in flat, stacked condition in a simple container such as 40 formed of plastic or metal, or the like. The container 40 has a rectangular cross-section and a suitable length so that a plurality of lures 20 can be packaged without disadvantageous loss of space. Although the container 40 illustrated is dimensioned for packaging a single stack of lures 20, it can be appreciated that the container can be made wider so that the lures will be stacked in haphazard arrangement as distinguished from the neat stack 42 as shown. A cover 44 for the container is contemplated for access thereinto.

I have realized successful embodiment of the invention in a lure 20 which was approximately one-quarter of an inch in width, three and three-quarters inches in length. The thickness was very small. Thus, the strip 20 was approximately fifteen times longer than the width thereof. The pronounced greater length of the lure 20 contributes to the desirable curling and twisting of the lure in water. After removal from the water, the lure 20 can be dried rapidly in the ambient atmosphere and used repeatedly without appreciable loss of odor properties in water. The white color of the lure was highly reflective in water and the entire lure had a life-like worm appearance in water.

It is believed that the invention has been described in sufficient detail to enable the skilled artisan to understand and practice the same. The invention has been defined in the claims with particularity and language intended to be liberally construed commensurate with the progress in the arts and sciences contributed by the invention.

What it is desired to secure by Letters Patent is:

1. A fishing lure comprising; a narrow, relatively thin strip of parchment material having a generally rectangular configuration, said strip having a main porous body layer and a thinner less porous skin layer, said layers being arranged in face-to-face relation and mutually adhered to each other substantially completely over said faces, said strip when immersed in water tending to curl and twist due to unequal water absorption by the main body layer and the skin layer.

2. A fishing lure as defined in claim 1 wherein the skin layer has a greater density than the body layer.

References Cited in the file of this patent

UNITED STATES PATENTS

| | | |
|---|---|---|
| 1,031,149 | Royer | July 2, 1912 |
| 1,688,110 | Bogart | Oct. 16, 1928 |
| 2,467,640 | Turner | Apr. 19, 1949 |
| 2,503,672 | Johnson et al. | Apr. 11, 1950 |
| 2,700,462 | Kramer | Jan. 25, 1955 |
| 2,913,104 | Parker | Nov. 17, 1959 |
| 2,967,372 | Pass et al. | Jan. 10, 1961 |

FOREIGN PATENTS

| | | |
|---|---|---|
| 168,427 | Great Britain | Sept. 5, 1921 |